United States Patent [19]

Fontanes

[11] Patent Number: 4,731,783
[45] Date of Patent: Mar. 15, 1988

[54] METHOD AND SYSTEM FOR TIME DIVISION MULTIPLE ACCESS SATELLITE TELECOMMUNICATIONS

[75] Inventor: Sylvain Fontanes, Chatou, France

[73] Assignee: Alcatel Espace, Courbevoe, France

[21] Appl. No.: 864,382

[22] Filed: May 19, 1986

[30] Foreign Application Priority Data

May 20, 1985 [FR] France ............................. 85 07550

[51] Int. Cl.$^4$ ............................................. H04J 3/16
[52] U.S. Cl. ....................................... 370/84; 370/104
[58] Field of Search ..................... 370/84, 79, 104, 95

[56] References Cited

U.S. PATENT DOCUMENTS

| | | | |
|---|---|---|---|
| 3,649,764 | 3/1972 | Maillet | 370/104 |
| 4,204,093 | 5/1980 | Yeh | 370/104 |
| 4,256,925 | 3/1981 | Goode | 370/104 |
| 4,315,330 | 2/1982 | Brickman et al. | 370/104 |
| 4,631,720 | 12/1986 | Koeck | 370/84 |
| 4,646,290 | 2/1987 | Hills | 370/84 |

FOREIGN PATENT DOCUMENTS 3313841 10/1984 Fed. Rep. of Germany .

OTHER PUBLICATIONS

Globecom, '82 IEEE Global Tele. Conf.; Conference Record, vol. 1, Miami, 29 Nov.-2 Dec. 1982, pp. A2.3-.1-A.2.3.8, IEEE, New York, Shuji Tasaka et al: "Stability and Performance of a Packet . . . ".
Patents Abstracts of Japan, vol. 8, No. 70 (E-235), 3 Apr. 1984; JP-A-58 218 249 (Toshihiko Kakinuma).
The New World of the Information Society, Proceedings of the Seventh International Conference on Computer Communication, Sydney, 30 Oct.-2 Nov., pp. 538-543, Toshiro Mizuno et al: "Random Burst Allocation in the CS-2 TDMA Demand Assignment Satellite . . . ".

Primary Examiner—Douglas W. Olms
Attorney, Agent, or Firm—Sughrue, Mion, Zinn, Macpeak, and Seas

[57] ABSTRACT

A frame (T) is sub-divided into identical time slots (61, 62, ..., 6N) of fixed duration, each of which is capable of containing at least one lowest data rate telephone channel. These time slots are assigned on demand so that a new call is spread over one or more bursts (81, 82, 83, 84) which are located in available ones of said time slots, or else in space which may be left available in time slots which are already partially occupied by other, low data rate calls.

5 Claims, 8 Drawing Figures

METHOD AND SYSTEM FOR TIME DIVISION MULTIPLE ACCESS SATELLITE TELECOMMUNICATIONS

The present invention relates to a novel method of Time Division Multiple Access (T.D.M.A.) telecommunications via satellite, with demand assignment.

BACKGROUND OF THE INVENTION

In T.D.M.A. satellite telecommunications, there are several types of system available, and some of them have been used for several years, for example the U.S. system SBS.

Other systems which have recently been put into service include, in particular, the French TELECOM 1 system which is an intra-company system, and the T.D.M.A. INTELSAT system which is used for international telephone and data transmission.

Some of these systems, for example the TELECOM 1 satellite system, use a so-called "demand assignment" system on a per call basis, as described, for example, in an article by J. C. Bousquet "Time division multiple access system with demand assignment for intra-company network using the satellite TELECOM "1" which appeared in "5th International Conference on Digital Satellite Telecommunications, Genoa, 23-26 Mar. 1981" at pages 11 to 18.

The function of a demand assignment system is to define the exact position where a newly arriving call is to be located in the transmission frame, with the call being transmitted by means of a burst whose length depends on the data rate to be transmitted, on the TDMA data rate, and on the length of a frame. So long as no rearrangement takes place, the time position of such a burst location remains unaltered from one frame to the next. Such a system must therefore be capable of indicating which burst is to receive a new call, the position of the call within the burst, and whether the burst needs to be modified in order to take the call, i.e. usually whether the burst needs to be lengthened. There also exist special cases, such as a frame in which no burst has yet been created, or in which there is no burst capable of taking the call, in which case the demand assignment system must be capable of giving all the information required to the network to enable a suitable new burst to be established.

When the frame is practically empty, there is no problem in placing a new burst. However, in the frequently occurring case of a frame which is already occupied by a relatively large number of other bursts, it becomes necessary to find a location which is large enough for conveying the new call, and this may require not only the operation of creating a new burst, but also the operation of displacing one or more other bursts within the frame in order to open up sufficient space for the new burst.

By definition, in TDMA each burst within a given frame is emitted by a different station. If it is desired, as in TELECOM 1 which uses a demand assignment system, to open up sufficient room within a frame to allow a new burst to be created, it becomes necessary to transmit a considerable amount of information to several stations, and this requires a fairly complex network.

The demand assignment system to which the present invention applies is not low transmission rate data traffic which can be transmitted and switched on a per burst basis with each burst containing complete routing information (i.e. the present invention is not concerned with so-called "bursty" traffic). Some known systems, e.g. ALOHA-SLOTTED ALOHA, use random transmission channel seizing, with full repetition of the transmitted data in the event of a collision.

In contrast, the present invention relates to calls set up on a call-by-call basis, e.g. ordinary telephone calls, for which all the characteristics defining the call (e.g. the locations and the sizes of the TDMA bursts) are defined at the beginning of the call so that once this data is available to all of the stations concerned there is no longer any risk of collision. Such a call requires "clearing down" at the end thereof, and the corresponding bursts are then no longer transmitted.

A first aim of the present invention is to provide a method and a system for demand assignment which require hardly any burst rearrangement within a frame, thereby considerably simplifying the system.

Furthermore, the complexity of this type of conventional demand assignment system, although large is not unmanagable when transmitting telephone channels at 64 kilobits per second, for example, since each channel occupies relatively little room within a frame, however the complexity considerably increases and becomes practically inextricable when video channels are to be transmitted in a frame (e.g. TV or video conferences) since the data rate of such channels may lie in the range 2 megabits/second to 30 megabits/second.

There is high demand at present for satellite transmission of television channels, and more generally for all kinds of image transmission. This traffic is expected to increase considerably over the next twenty years, both concerning international TV transmission and concerning video conferences within a region or between regions.

Another aim of the invention is to provide a method and a system for demand assignment which provides simple means for inserting video telecommunications channels in an existing frame.

SUMMARY OF THE INVENTION

The present invention provides a TDMA satellite telecommunications method of the type using demand assignment for all new calls to be established, said method consisting in using a frame which is divided into identical time slots of fixed duration, each of which is capable of containing at least one telephone channel at the lowest possible data rate, and said demand assignment consisting in spreading the new data over one or more new bursts which are placed either into available time slots or else into space which may be available in time slots already occupied by other, low data rate calls.

BRIEF DESCRIPTION OF THE DRAWINGS

An embodiment of the invention is described by way of example with reference to the accompanying drawings, in which.

DETAILED DESCRIPTION OF A PREFERRED IMPLEMENTATION OF THE INVENTION

Figure 1:
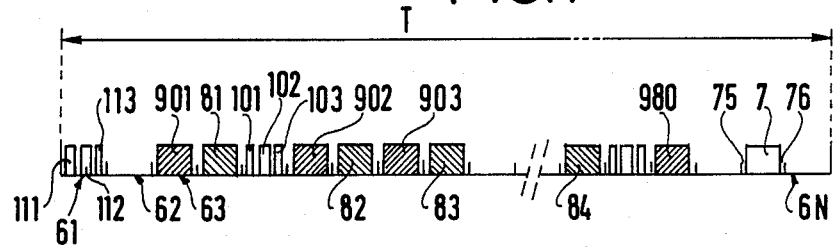
FIG. 1 shows a TDMA frame used in a demand assignment system in accordance with the invention.
Figure 6:
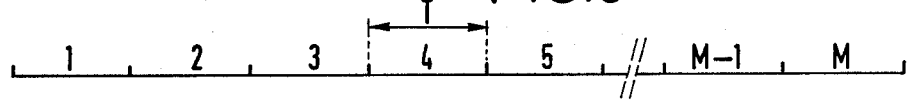
FIG. 6 is a diagram showing the TDMA multiframe structure which incorporates a FIG. 1 frame.

With reference to FIG. 1, a frame of duration T=20 milliseconds, for example, is used in the TDMA telecommunications method and system with demand assignment in accordance with the invention. As shown in the drawings, the FIG. 1 frame is, for example, one-fourth of a multi-frame which is represented in FIG. 6 as comprising M frames (1, 2, 3, 4, 5, ..., M−1, M).

In accordance with a first aspect of the present invention, each frame, e.g. the frame shown in FIG. 1, is built up from N equal time slots (61, 62, 63, ..., 6N) of fixed duration, with each time slot being capable of transmitting at least one lowest data rate channel.

In accordance with a second aspect of the present invention, each of said time slots is of a size (ignoring guard bands) suitable for transmitting the lowest data rate video communications channel, for example a worst quality video conference channel, operating at 384 kilobits per second if currently proposed standards are accepted. For example, traffic burst 7 in FIG. 1 which, together with two guard gaps (75, 76) which are conventionally provided for compensating variations in the position of the satellite, occupies the last time slot but one and is constituted by a burst transmitting a single 384 kilobit/sec. video conference channel.

In accordance with another aspect of the invention, each video communications channel which has a data rate greater than the minimum data rate (i.e. 348 kilobits/sec. in this case) is shared within a given frame over a plurality of bursts distributed within the frame, each of which transmits a portion of the data for that channel, with the various portions following one another in chronological order.

For example, in FIG. 1, four bursts 81, 82, 83, and 84 transmit the data belonging to a single 1.5 megabit/sec. video conference channel, with said data being distributed chronologically between said four bursts, while twenty-four bursts 901, 902, 903, ..., 980 transmit a 30 megabit/sec. TV channel.

Furthermore, and in a particularly advantageous manner for simplifying the demand assignment process as much as possible, each traffic burst (81, 901, 7, ...) corresponding to the transmission of all or a portion of a video communications channel is of identical fixed length for all of said bursts. In the present example, this length is thus equal to the length of the burst 7 which transmits a lowest data rate video conference signal.

In order to transmit low data rate channels, e.g. telephone channels at 32, 64, or 128 kilobits/sec., a plurality of channels may readily be transmitted via a single burst from the same station, and several of these bursts may occupy a common time slot in the FIG. 1 frame. For example, time slot 65 comprises three bursts 101, 102 and 103 respectively transmitting a 64 kbit/sec., a 128 kbit/sec. and a 64 kbit/sec. channel from three different traffic stations.

Finally, time slot 61 is used for transmitting a service channel and comprises, for example, two reference bursts 111 and 112, together with a signalling burst 113.

Using the organization in accordance with the invention of a TDMA frame as shown in FIG. 1 and as described above, call demand assignment may take place directly solely as a function of the available time slots and without displacing any of the bursts within the frame as has been necessary in the past.

For example, if it is desired to set up a new video call, the method in accordance with the invention consists simply in inspecting the list of available time slots within the TDMA frame and in indicating the numbers of these time slots to the station which is to transmit the bursts. Said station then merely has to organize the bursts chronologically within the available time slots to ensure that they are properly transmitted.

Furthermore, it has been shown that bursts corresponding to video transmissions are advantageously of fixed length, thereby further simplifying the demand assignment system by avoiding the need to redefine the beginning and the length of the burst to be applied at each station at the beginning of each time slot. Once a station has had a time slot allocated thereto, it merely has to transmit the corresponding burst (supposing it is transmitting a video signal). Since the corresponding data rate is not necessarily accurately matched to said length, the useful portion of the transmitted video may need adjusting as a function of the real data rate received at the station.

Figure 2:
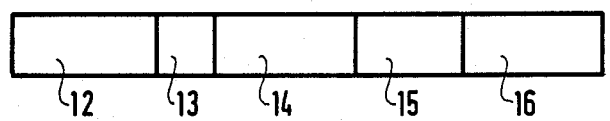
FIG. 2 is a diagram showing the structure of a reference burst used in a system in accordance with the invention.

FIG. 2 shows a reference burst such as the burst 111 or 112 as transmitted in a system in accordance with the invention. This burst conveys data from one of the reference stations which is a controller station for the entire TDMA transmission system via a given satellite.

Such a burst comprises, in succession:

a portion 12 which is conventionally constituted by bits suitable for recovering the clock rate and carrier frequencies;

a "unique word" 13 which is also conventional and which serves to unambiguously define the beginning of the useful data contained in the burst;

a first useful portion 14 for use by service channels providing communication between the reference station operators and the traffic station operators a second useful portion 15 for transmitting frame management messages; these messages are used for instructing a given traffic station to emit a new burst in the frame, either by sending the time slot number in which the new burst is to be emitted (for a video channel), or else by supplying data on the precise time position of the beginning of the burst and on the length attributed thereto (for use with telephone channels); and a last useful portion 16 for transmitting traffic station synchronization messages: these messages are used by each traffic station for accurately locating the beginning of each traffic burst relative to the received reference burst and taking account of variations in the geographical position of the satellite, this ensures that the various bursts emitted by the various traffic stations do not overlap at the satellite.

Figure 3:
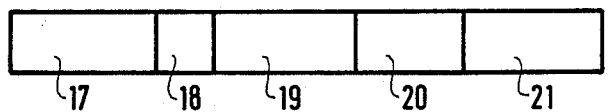
FIG. 3 is a diagram showing the structure of a signalling and synchronizing burst used in a system in accordance with the invention.

FIG. 3 shows a signalling burst, such as burst 113 in FIG. 1, as transmitted in a system in accordance with the invention. The burst is transmitted by one of the traffic stations, and in particular by a station desiring to set up a new call, and the burst is intended to inform the other stations of all the necessary data relating to said call. As shown diagrammatically in the figure, such a burst comprises, in succession:

conventional portions 17, 18, and 19 relating respectively, as before, to carrier and clock rate recovery, to the "unique word" and to service channels;

a first useful portion 20 for transmitting messages emitted by traffic stations to the reference stations concerning requests for new assignments and requests for reservations; and a second useful portion 21 for transmitting synchronization messages having the purpose of enabling each station to remain in synchronization in the absence of an traffic.

Figure 4:
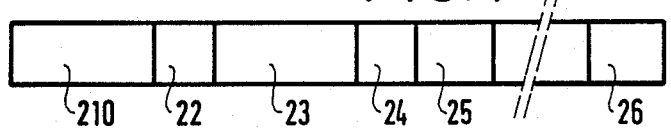
FIG. 4 is a diagram showing the structure of a low data rate traffic burst transmitted by a system in accordance with the invention.

FIG. 4 is a diagram of a traffic burst for conveying a low data rate channel, such as one of the packets 101, 102, or 103 shown in FIG. 1. Such a burst might be constituted by a plurality of telephone channels transmitted from a single traffic station, for example.

Such a packet comprises, in succession:

conventional portions 210, 22, and 23 relating, as before, respectively to recovering clock rates and carrier frequencies, to said unique word, and to service channels; and a plurality of useful portions 24, 25, . . . , 26, containing data representative of different telephone channels as emitted by the station under consideration, and thus corresponding to various telephone conversations from different subscribers.

Figure 5:
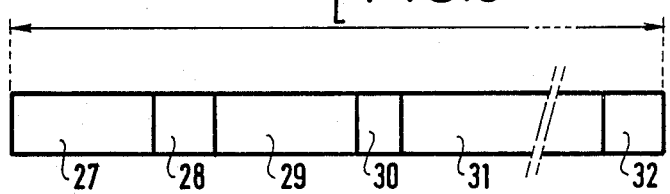
FIG. 5 is a diagram showing the structure of an average to high data rate burst transmitted by a system in accordance with the invention.

FIG. 5 is a diagram of a traffic burst for transmitting video communications, in accordance with the invention.

As mentioned above, such a burst has a fixed duration L which is designed so that the burst, e.g. burst 7 in FIG. 1, occupies (ignoring the surrounding guard gaps 75 and 76 in FIG. 1), one of the fixed time slots (61, 62, 63, . . . , 6N) which constitute a frame in accordance with the invention, said burst and said time slots being suitable for transmitting a lowest data rate video communications signal, e.g. a signal at 384 kilobits/sec.

The time slots (61, 62, . . . , 6N, FIG. 1) and the video transmission bursts (7, 901 to 980, 81 to 84, FIG. 1) are all of fixed duration so demand assignment in accordance with the invention is highly simplified relative to the prior art. Each station merely has to define for each time interval whether it constitutes a video burst, together with the beginning and the duration of the burst: when a time slot is allocated thereto, it may directly emit the corresponding burst. However, since the corresponding data rate is not necessarily matched accurately to the burst duration, the useful portion of the video signal transmitted in said burst must be adjusted as a function of the real data rate emitted by the station, thus explaining why the FIG. 5 burst includes, after the conventional initial portions 27 (for recovering the clock rate and the carrier) 28 (the "unique word") and 29 (service channels), the following:

a portion 30 indicating the duration (i.e. length) of the useful video portion (31) transmitted by said burst;

the useful video portion (31) transmitted in said burst, which portion is thus of variable length; and a portion 32 constituted by filler bits, e.g. by all one bits or all zero bits, serving purely to fill out the burst to said fixed duration or length L.

One of the advantages of the demand assignment method in accordance with the invention is to make it easy to provide a satellite telecommunications system which has decentralized control. Demand assignment is then made directly by one of the traffic stations without requiring a controlling station to intervene. Thus the station which receives a call directly provides the required assignment after transmitting a data message to all the other traffic stations and taking account of data messages which it has itself received in the meanwhile from the other stations.

Figure 7:
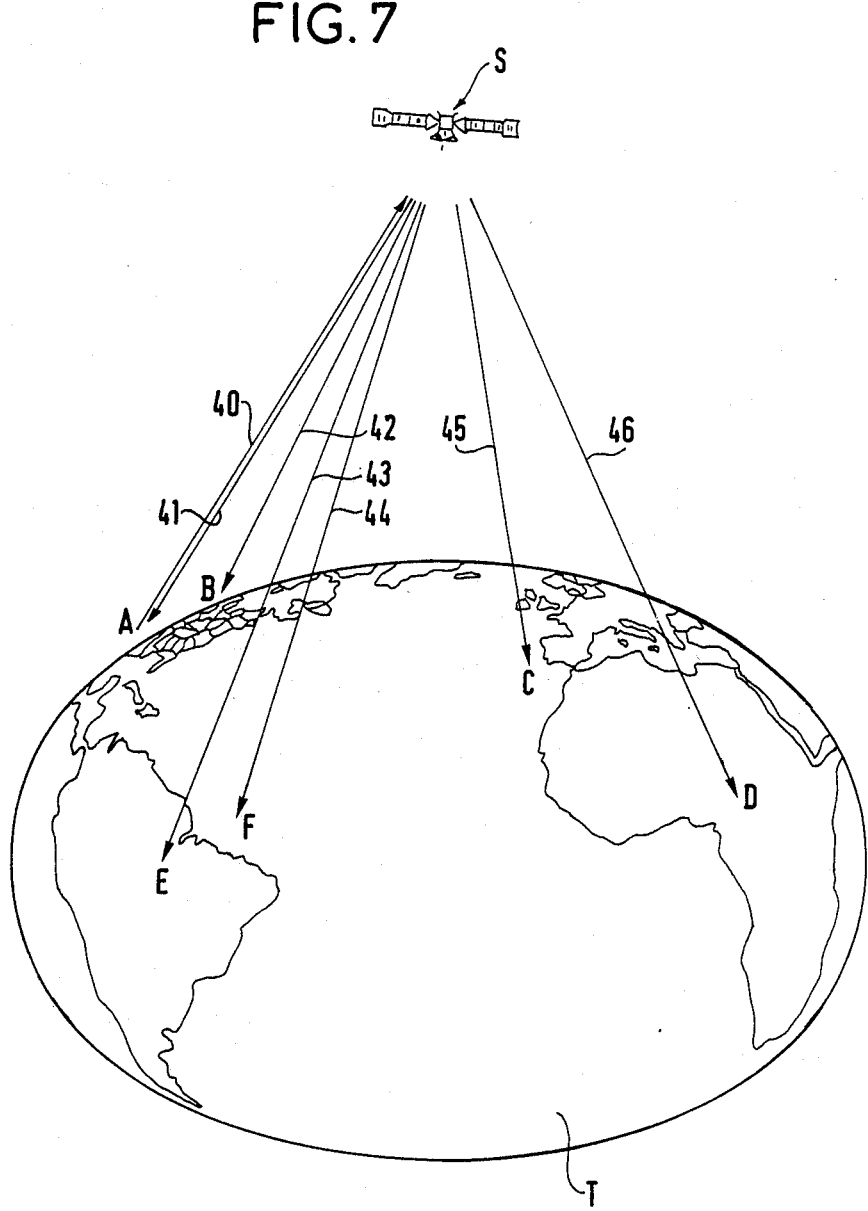
FIG. 7 is a diagram showing a telecommunications system using a geostationary satellite and employing the invention.
Figure 8:
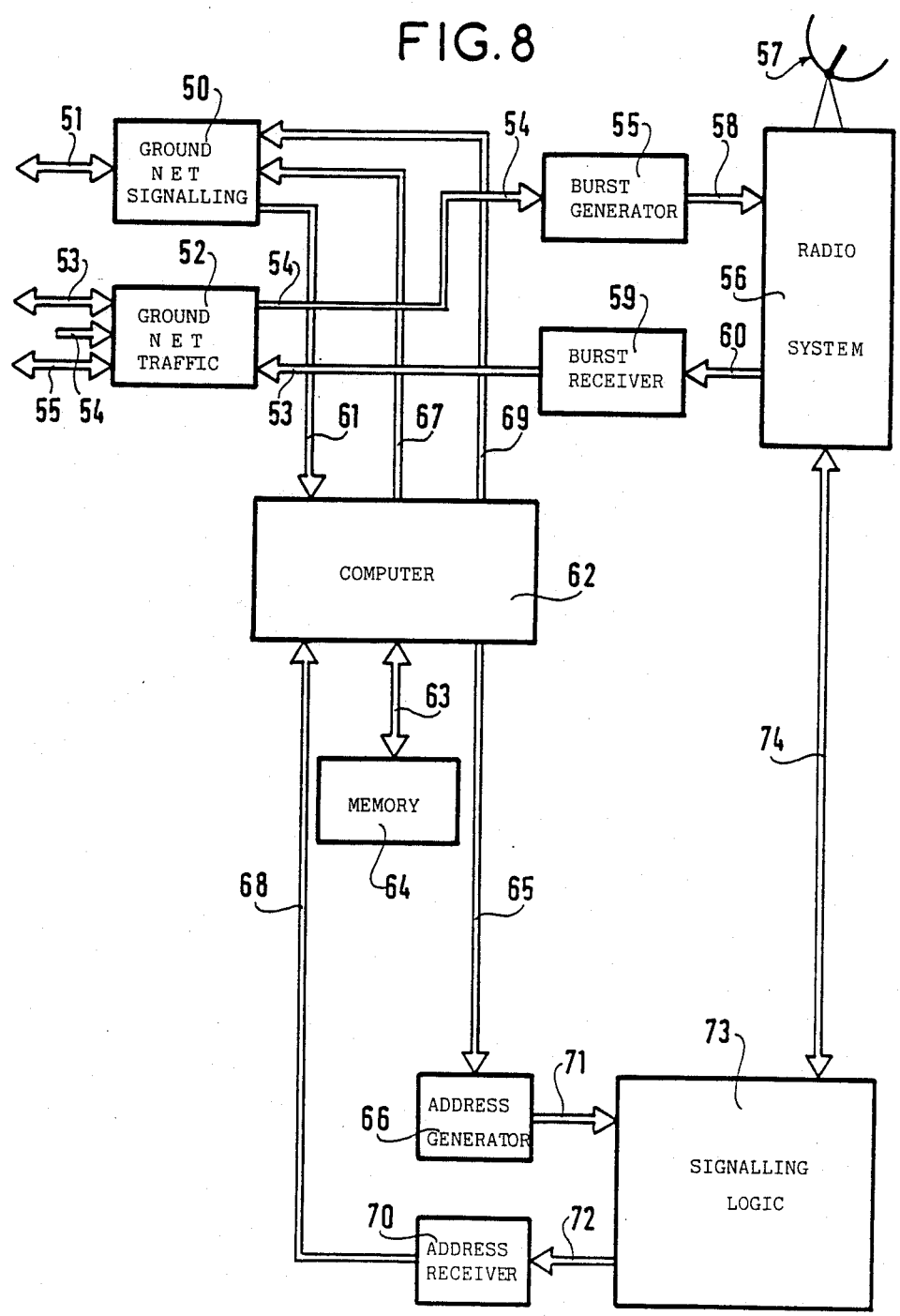
FIG. 8 is a block diagram of a practical implementation of a traffic station in a system in accordance with the invention.

The following description is given by way of nonlimiting example with reference to FIGS. 7 and 8 and concerns a satellite telecommunications system in accordance with the invention and making use of decentralized system control and demand assignment.

In FIG. 7 which is given purely by way of illustration, the globe T is shown diagrammatically in conjunction with a geostationary satellite S. Traffic stations are designated by reference letters A, B, C, D, E, and F. The reference stations which now serve merely for overall synchronization are of conventional design and are not shown specially in the drawing.

FIG. 8 is a block diagram of a practical implementation of a traffic station A, with the other traffic stations B to E being identical.

In accordance with the invention, and in the context of decentralized demand assignment, FIG. 7 shows a station A which performs its own direct assignment for new bursts, e.g. for a video communication which has been requested from the ground network connected thereto, and the traffic station A has no need to receive instructions from a control center connected to one of the reference stations (not shown).

As shown in FIG. 7, station A thus transmits to the satellite S a signal 40 which contains an address indication message indicating the time slot numbers which it has observed are available in the frame, and which it intends to use for transmitting a new video call which it has just received.

The satellite S then retransmits this address indication message via signals 42 to 46 to traffic stations B to E, and also retransmits the same message back to the initiating station A via signal 41.

Supposing that station A receives its own address indication message back from the satellite via signal 41 without receiving any other address indication messages during the transmit/receive time interval indicating that the time slots it had selected have already been requested or used by other traffic stations, station A directly emits the bursts specified in the time slots specified by its own address indication message. Otherwise, it assumes that the specified time slots are not available and the requested call is not set up.

Each traffic station thus maintains throughout each TDMA frame a table of the available time slots, which table is constantly updated by address indication messages which may arrive thereat at any moment from the other stations.

Furthermore, since each traffic station may emit address indication messages, the system is necessarily designed, as shown in FIG. 7, for these messages to be received by all of the stations, including the station which sent the message. The sending station is thus made aware of how much time must elapse before such a message is received by all of the other stations, with the transmission time being one of the characteristics of the system. It is thus possible to verify that the message has been properly received by the other stations.

In the case mentioned above where a station emitting an address indication message receives another address indication message between emitting (40) and receiving (41) its own address indication message, which other message must necessarily have been emitted by some other station before its own message was emitted, the station must modify its assignments as a consequence of the received message and it must then re-emit a modified address indication message, and it must continue operating in this way until the call requested by the ground network can be set up.

In FIG. 1, reference 50 designates a sub-assembly constituting the ground network signalling interface, and a bus 51 is connected thereto. The ground network may be constituted by a cable network, a microwave beam antenna, a direct link to a user, etc. . .

Thus, station A receives call requests via said sub-assembly 50 and it also emits signalling to the user via said sub-assembly, e.g. it could transmit ringing in the event of a direct connection for a telephone call.

Reference 52 designates a sub-assembly constituting the communications interface with the ground network. In conventional manner, the sub-assembly 52 includes interfaces with cables or microwave beams serving for transmitting communications over buses 53, 54, 55, etc.

For television, block 52 comprises, for example, a standards converter enabling direct transmission over analog channels of digital signals received from the satellite. In the opposite direction, the block 52 provides the inverse functions and transforms analog signals received from ground networks into digital signals.

The block 52 receives digital signals from the satellite over a first bus 53 connected to its station side, and traffic signals received from ground channels leave the station side of the block 50 via a second bus 54, with these traffic signals being converted into digital form if they were received in analog form.

The second bus 54 is connected to a burst generator block 55 which serves to create bursts, to shape them, and to emit them towards the satellite by means of a radio system 56 including conventional modulator assemblies, frequency transposers, etc., with radio transmission taking place via a send antenna 57. The burst generator 55 is connected to the radio system 56 via a bus 58.

Similarly, the bus 53 is connected to a burst receiver block 59, which is in turn connected to the radio system 56 via a bus 60 and which serves to transform data bursts received from the satellite into continuous digital trains.

A bus 61 leaves the signalling interface logic sub-assembly 50 and connects to a logic block 62 for monitoring and controlling resources. This block is constituted by a computer which is programmed to monitor and to update the status of frame time slots for satellite transmission, and it is associated via a bus 63 with a memory 64 for storing said time slots, with said memory storing, in particular, information concerning which time slots are available and which time slots are occupied by communications. The memory 64 thus dynamically stores the status of the time slots in the TDMA frame in accordance with the invention, and its purpose is to maintain an updated table of the fixed time slots in said frame.

The function of the computer 62 is to analyze requests to set up calls from the ground network which arrive via the bus 61 and the interface 50, and to examine the available resources by means of the tables stored in the dynamic memory 64. It is connected by a bus 65 to an address indication message generator 66. It also serves to accept or refuse requests for new calls. Such acceptance or refusal is transmitted via the bus 67 back to the interface 50. As explained above, such acceptance or refusal decisions are linked to the computer 62 analyzing the available resources, and depend on the number of available time slots in a frame. If too few time slots are available, a call request is refused and no call is established. If enough time slots are available, and in addition an address indication message has been received from the satellite via a bus 68 to authorize burst generation, an acceptance message is sent to the user via the bus 67, the interface 50 and the bus 51, thereby allowing the requested call to be set up.

Finally, the computer 62 is connected to the interface 50 via a bus 69 for transmitting call requests from other traffic stations to the ground network. It is necessary for the time slots defined in an address indication message from another station to be put into communication with time slots existing in the resources of the ground network connected to station A, thus implying that the corresponding request from said other traffic station is forwarded to users.

The signals received over the bus 68 come from a logic block 70 for receiving and processing address indication messages received by the satellite.

The blocks 66 and 70 are connected as shown via buses 71 and 72 to a common logic block 73 for providing signalling messages on a common signalling channel with the satellite, which channel is provided by one of the low data rate signalling bursts, e.g. the burst 113 shown in FIG. 1. The logic block 73 is connected to the radio system 56 by a bus 74.

In summary, the decentralized procedure used in the above-described satellite telecommunications system operates as follows:

Each traffic station continually updates the status of the time slots every time it receives a message over the signalling channel. Thus, each station always has an accurate list of time slots which are free at any given instant.

When a traffic station receives a request from a user for a new call, it emits to the other stations (FIG. 7) an address indication message containing:

the characteristics of the call; and the identity of the frames and time slots which it intends to use.

It waits until it has received its own message back from the satellite (signal 41, FIG. 7), which return message constitutes an acknowledgement signal that is good for all of the stations involved (B to F, FIG. 7).

If the message is received unambiguously and provided no other message is received in the meanwhile from some other station, the time slots assignment is confirmed and the call is set up.

If some other message is received before its own message is returned, the other message takes priority and the initiating station A must change its own message before trying again; in the event that the resources available are no longer capable of establishing the requested call, the corresponding address indication message must be cancelled or delayed.

The requested call is thus either established, or delayed, or else it is refused.

Naturally the invention is not limited to the preferred decentralized operation described above, and it could also be applied to a centrally controlled system in which the assignments are made by a member situated in a controlling center. A centralized control system would operate as follows:

When a traffic station receives a call request from a user, it sends a request message to the control center via the satellite.

The request may be any of the following:

a request for a new call to be set up as quickly as possible;

a clear down request for a call which was being operated in real time; or a request from a user to make a reservation for a future call whose parameters (set-up instant, duration, . . .) are defined in the request.

Such call request messages either use a specific signalling burst transmitted by the station which receives the request from the user, or else they use the service channels in an existing traffic burst, also transmitted by said station.

The control center then establishes a list of time slots to be assigned to the call that is to be set up, and then transmits this list to the stations concerned, i.e. the traffic stations concerned by the call to be set up, and the reference stations.

The time slots assignments are then changed synchronously in all the stations concerned using an identical procedure to that already used in the INTELSAT TDMA network. Once this has been completed, each station is authorized to emit bursts in certain time slots or to receive bursts in certain other time slots.

The traffic station concerned, which has all of the characteristics of the emission channel available to it, can then:

define the characteristics of each of the bursts which it is going to send (position, length, . . . );

insert these new bursts into the designated frame, (it is free to define the beginning of transmission instant as a function of its own constraints); and cease sending bursts following a clear down request.

The reception stations ready themselves for receiving the bursts in the designated time slots.

I claim:

1. A TDMA satellite communications method in which plural orginating stations transmit data over respective channels in the form of bursts at different corresponding data rates, comprising the steps of:

establishing a common transmission frame for plural ones of said channels, said frame being divided into indentical time slots of fixed duration, said fixed duration corresponding to a length of a single burst of a lowest data rate plus guard gaps;

at each said station originating a new call, assigning to itself for said new call at least one time slot left available by other calls in progress without reassigning any of said time slots among said calls in progress, a number of said time slots assigned to each call being dependent upon the data rate of the call, no more than a single time slot being assigned to a call at said lowest data rate; and terminating a call by interrupting transmission in said time slot assigned thereto.

2. The TDMA satellite communications method of claim 1, wherein slot assignments for each call are maintained throughout the duration of the call.

3. The TDMA satellite communications method of claim 1, wherein, for calls having a plurality of assigned slots, at least some of said slots are noncontiguous.

4. The TDMA satellite communications method of claim 1, further comprising the steps of, at each said originating station, transmitting to other ones of said originating stations messages indicating which of said time slots are assigned to said station, maintaining a current call table in response to said messages received from other ones of said stations, and, prior to originating a call, examining said current call table to determine which time slots are available.

5. The TDMA satellite communications method of claim 1, further comprising the step of transmitting a plurality of bursts of a duration of less than said length of a single burst of said lowest data rate in a single one of said frames.

* * * * *